(12) United States Patent
Nagao

(10) Patent No.: US 12,470,444 B2
(45) Date of Patent: Nov. 11, 2025

(54) SEMICONDUCTOR DEVICE AND COMMUNICATION SYSTEM

(71) Applicant: ROHM CO., LTD., Kyoto (JP)

(72) Inventor: Kei Nagao, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 62 days.

(21) Appl. No.: 18/388,395

(22) Filed: Nov. 9, 2023

(65) Prior Publication Data

US 2024/0163141 A1    May 16, 2024

(30) Foreign Application Priority Data

Nov. 16, 2022 (JP) .................................. 2022-183122

(51) Int. Cl.
*H04L 25/40* (2006.01)
*H04L 12/40* (2006.01)

(52) U.S. Cl.
CPC .... *H04L 25/40* (2013.01); *H04L 2012/40215* (2013.01)

(58) Field of Classification Search
CPC .. H04B 1/38; H04B 1/40; H04L 7/044; H04L 12/40; H04L 12/40013; H04L 25/0272; H04L 25/38; H04L 25/40; H04L 2012/40215
USPC ........ 375/219, 220, 257, 356, 369; 358/413; 370/257, 282, 284, 304, 305
See application file for complete search history.

(56) References Cited

U.S. PATENT DOCUMENTS

| | | | | |
|---|---|---|---|---|
| 4,394,757 A | * | 7/1983 | Muzumdar | H04Q 11/04 370/522 |
| 5,487,151 A | * | 1/1996 | Kikuchi | G08C 25/00 714/49 |
| 6,016,309 A | * | 1/2000 | Benayoun | H04L 25/0262 370/465 |
| 2008/0002735 A1 | * | 1/2008 | Poirier | H04L 12/403 370/445 |

FOREIGN PATENT DOCUMENTS

| | | | |
|---|---|---|---|
| JP | 2008227570 A | * | 9/2008 |
| JP | 2017-224946 | | 12/2017 |
| KR | 100291388 B1 | * | 6/2021 |

* cited by examiner

*Primary Examiner* — Young T. Tse
(74) *Attorney, Agent, or Firm* — Fish & Richardson P.C.

(57) ABSTRACT

A semiconductor device includes a reception data input terminal configured such that reception data, which is serial data, is input; a transmission data output terminal configured such that transmission data, which is serial data, is output; and a communication part configured to receive the reception data and transmit the transmission data, wherein the communication part includes: a counter; and a synchronization part configured to monitor the transmission data if the semiconductor device is other than a target device set in the reception data, and reset a count by the counter upon detecting a stop bit and a start bit at frame switching in the transmission data.

10 Claims, 14 Drawing Sheets

SEMICONDUCTOR DEVICE AND COMMUNICATION SYSTEM

CROSS-REFERENCE TO RELATED APPLICATION

This application is based upon and claims the benefit of priority from Japanese Patent Application No. 2022-183122, filed on Nov. 16, 2022, the entire contents of which are incorporated herein by reference.

TECHNICAL FIELD

The present disclosure relates to a semiconductor device and a communication system.

BACKGROUND

A semiconductor device provided with a serial communication function has been used in various applications.

An example of a circuit technique related to serial communication is known in the art.

BRIEF DESCRIPTION OF DRAWINGS

The accompanying drawings, which are incorporated in and constitute a part of the specification, illustrate embodiments of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Hereinafter, exemplary embodiments of the present disclosure will be described with reference to the drawings.

1. Communication System

Figure 1:
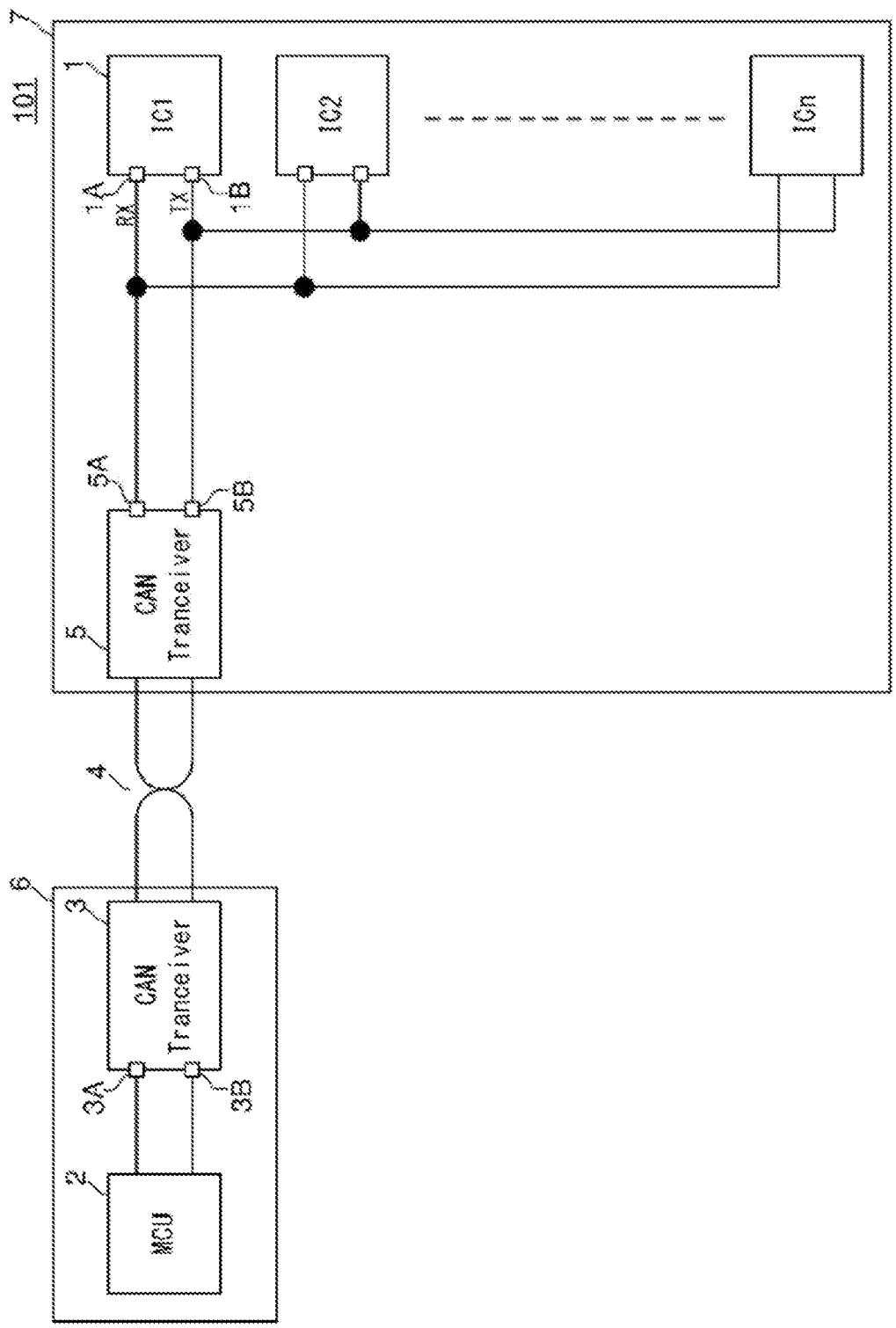
FIG. 1 is a diagram illustrating a configuration of a communication system according to an exemplary embodiment of the present disclosure.

FIG. 1 is a diagram illustrating a configuration of a communication system 101 according to an exemplary embodiment of the present disclosure. The communication system 101 includes n devices 1 (where n is an integer of 2 or more), an MCU (microcontroller unit) 2, a CAN (controller area network) transceiver 3, a CAN bus 4, and a CAN transceiver 5. The communication system 101 is installed in a vehicle as an example, and the same applies to other communication systems described below.

Communication by a UART (Universal Asynchronous Receiver/Transmitter) is performed between the MCU 2 and the CAN transceiver 3. The UART is a protocol for exchanging serial data between two devices. In the UART, bidirectional communication is performed between a transmitting side and a receiving side by two lines.

Communication by the CAN bus 4 is performed between the CAN transceivers 3 and 5. The CAN transceiver 3 includes a TXD (transmission data input) terminal 3A and an RXD (reception data output) terminal 3B. The CAN transceiver 3 outputs the data inputted to the TXD terminal 3A to the CAN bus 4, and outputs the data inputted from the CAN bus 4 from the RXD terminal 3B.

The CAN transceiver 5 includes an RXD terminal 5A and a TXD terminal 5B. The CAN transceiver 5 outputs the data inputted to the TXD terminal 5B to the CAN bus 4, and outputs the data inputted from the CAN bus 4 from the RXD terminal 5A.

The semiconductor device 1 is an IC (integrated circuit) in which a circuit having a predetermined function is integrated, and is configured, for example, as an LED (light emitting diode) driver IC. Further, the n semiconductor devices 1 do not all have the same function.

The semiconductor device 1 includes an RX (reception data input) terminal TA and a TX (transmission data output) terminal 1B. An n number of RX terminals TA are commonly connected to the RXD terminal 5A. An n number of TX terminals 1B are commonly connected to the TXD terminal 5B.

Since the n semiconductor devices 1 respond to the same protocol, the n semiconductor devices 1 can be commonly connected to the same CAN transceiver 5. Reception data RX outputted from the RXD terminal 5A is inputted to the n RX terminals 1A. The device address of one of the n semiconductor devices 1 is specified in the reception data RX. Furthermore, the transmission data TX outputted from the TX terminal 1B is inputted to the TXD terminal 5B.

The MCU 2 and the CAN transceiver 3 are installed at the substrate 6. The n semiconductor devices 1 and the CAN transceiver 5 are installed at a substrate 7 different from the substrate 6. The substrate 6 and the substrate 7 are connected by a harness (not shown). The CAN bus 4 is installed by the harness.

Figure 2:
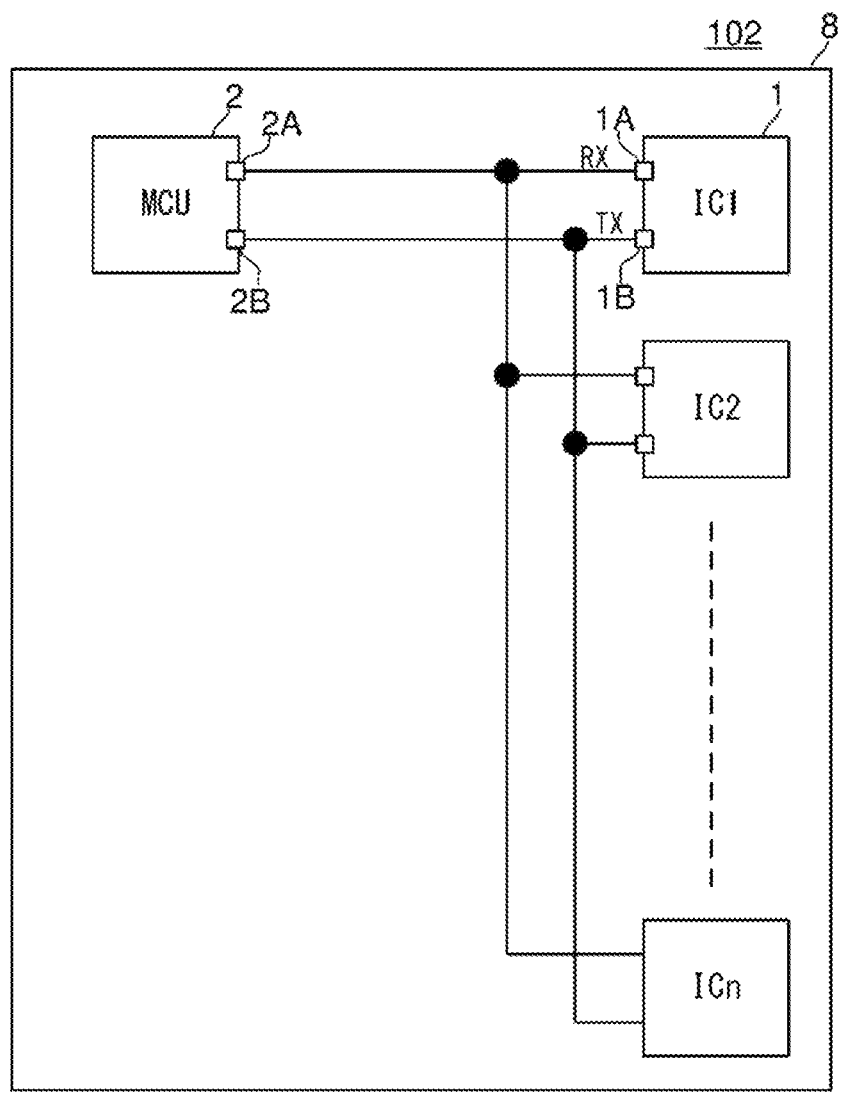
FIG. 2 is a diagram illustrating a configuration of a communication system according to another exemplary embodiment of the present disclosure.

FIG. 2 is a diagram illustrating a configuration of a communication system 102 different from that shown in FIG. 1. The communication system 102 includes an MCU 2 and n semiconductor devices 1. The MCU 2 and the n semiconductor devices 1 are installed at the same substrate 8. That is, in the communication system 102, a CAN transceiver is not used and a harness is not required.

The n RX terminals 1A are commonly connected to the RXD terminal 2A of the MCU 2. The n TX terminals 1B are commonly connected to the TXD terminal 2B of the MCU 2.

2. Configuration of CAN Transceiver

Figure 3:
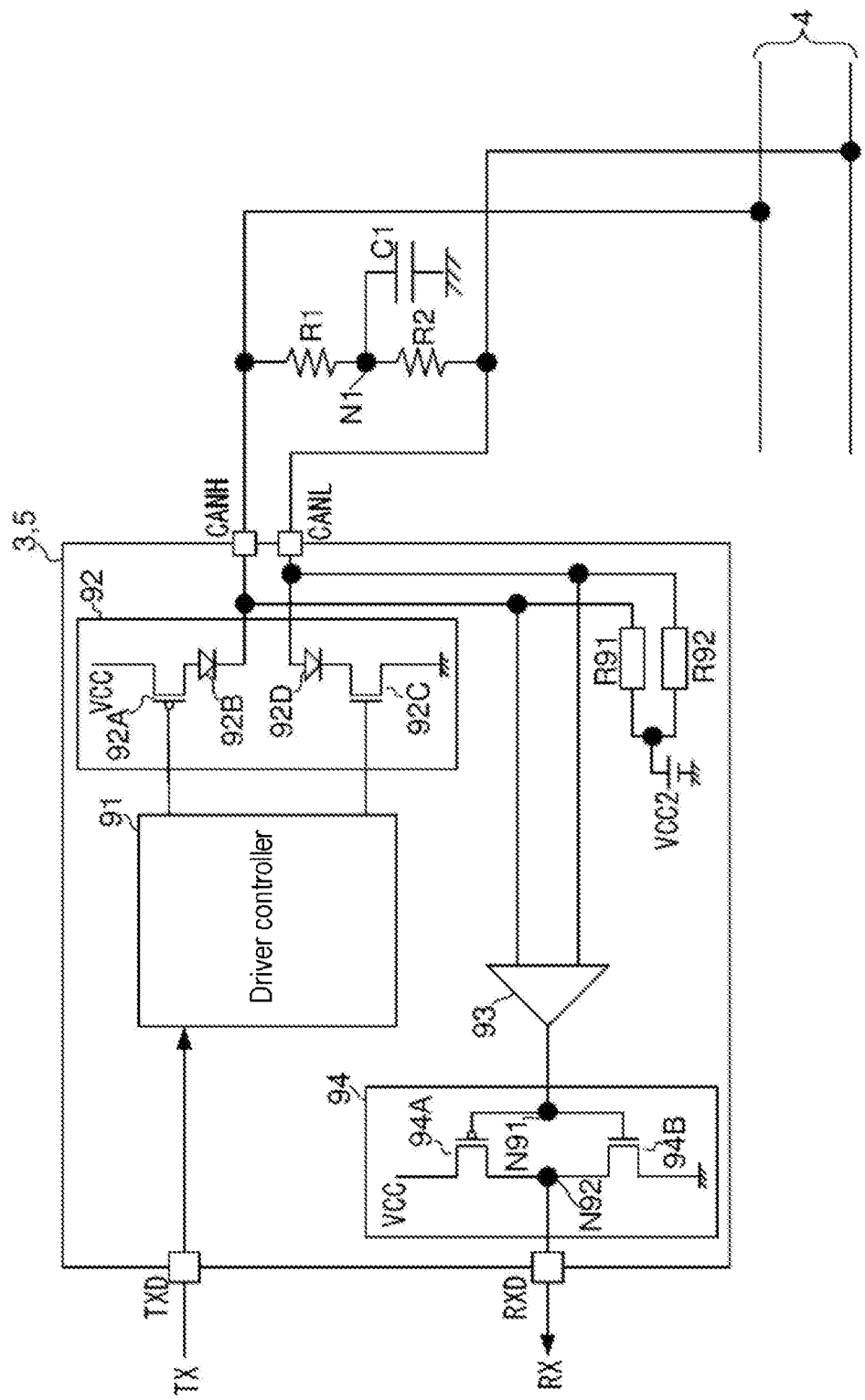
FIG. 3 is a diagram illustrating a configuration example of a CAN transceiver.

FIG. 3 is a diagram illustrating a configuration of the CAN transceivers 3 and 5 used in the communication system 101 of FIG. 1 described above. Each of the CAN transceivers 3 and 5 includes a driver controller 91, a driver 92, a receiver 93, and an output part 94. Further, each of the CAN transceivers 3 and 5 includes a TXD terminal, an RXD terminal, a CANH terminal, and a CANL terminal.

The CANH terminal and the CANL terminal are respectively connected to each line of the CAN bus 4. Terminating resistors R1 and R2 are connected in series between the CANH terminal and the CANL terminal. The resistance values of the terminating resistors are determined by ISO11898, and each of the terminating resistors R1 and R2 is composed of a 60Ω resistor. One end of a capacitor C1 is connected to a connection node N1 to which the resistors R1 and R2 are connected.

The driver 92 includes a PMOS transistor (P-channel MOSFET (metal-oxide-semiconductor field-effect transistor)) 92A, a diode 92B, an NMOS transistor (N-channel MOSFET) 92C, and a diode 92D. The source of the PMOS transistor 92A is connected to an application terminal of a power supply voltage VCC. The drain of the PMOS transistor 92A is connected to the anode of the diode 92B. The cathode of the diode 92B is connected to the CANH terminal. The source of the NMOS transistor 92C is connected to the ground end. The drain of the NMOS transistor 92C is connected to the cathode of the diode 92D. The anode of the diode 92D is connected to the CANL terminal. The diodes 92B and 92D are used to prevent backflow of a current when a surge occurs.

The driver controller 91 controls the on/off of the PMOS transistor 92A and the NMOS transistor 92C based on the transmission data TX inputted from the outside via the TXD terminal.

More specifically, since when the PMOS transistor 92A and the NMOS transistor 92C are turned on, the current flowing through the terminating resistors R1 and R2 is common, the voltage drops occurring in the terminating resistors R1 and R2 are the same, the high-side signal CANH generated at the CANH terminal is a voltage higher than the voltage at a connection node N1 (=midpoint voltage) by the voltage drop, and the low-side signal CANL generated at the CANL terminal is a voltage lower than the voltage at the connection node N1 (=midpoint voltage) by the voltage drop. In this case, the high-side signal CANH is at a high level, and the low-side signal CANL is at a low level.

Here, the CANH terminal and the CANL terminal are connected to an application terminal of a power supply voltage VCC2 via resistors R91 and R92, respectively. When the PMOS transistor 92A and the NMOS transistor 92C are turned off, the voltage at the connection node N1 is gradually brought closer to the second power supply voltage VCC2 due to the action of the resistors R91 and R92, which have relatively high resistance values. The second power supply voltage VCC2 is the low level of the high-side signal CANH and the high level of the low-side signal CANL, and is the same voltage as the midpoint voltage.

In this way, the transmission data TX inputted to the TXD terminal is outputted from the CANH terminal and the CANL terminal to the CAN bus 4.

Meanwhile, the output part 94 includes a PMOS transistor 94A and an NMOS transistor 94B. The source of the PMOS transistor 94A is connected to the application terminal of the power supply voltage VCC. The drain of the PMOS transistor 94A is connected to the drain of the NMOS transistor 94B at anode N92. The source of the NMOS transistor 94B is connected to the ground end. The voltage at the CANH terminal and the voltage at the CANL terminal are inputted to the receiver 93. The output terminal of the receiver 93 is connected to a node N91 to which the gate of the PMOS transistor 94A and the gate of the NMOS transistor 94B are connected. The node N92 is connected to the RXD terminal.

The receiver 93 applies a signal of a high level or a low level to the node N91 depending on a difference in input voltages. Therefore, the output part 94 outputs a signal, in which the output of the receiver 93 is logically inverted, to the outside as reception data RX from the RXD terminal. In this way, the data inputted from the CAN bus 4 is outputted from the RXD terminal.

3. Comparative Example

Prior to describing the embodiments of the present disclosure, a comparative example for comparison will be described. This will make problems clearer.
<3-1. Configuration of Semiconductor Device>

Figure 4:
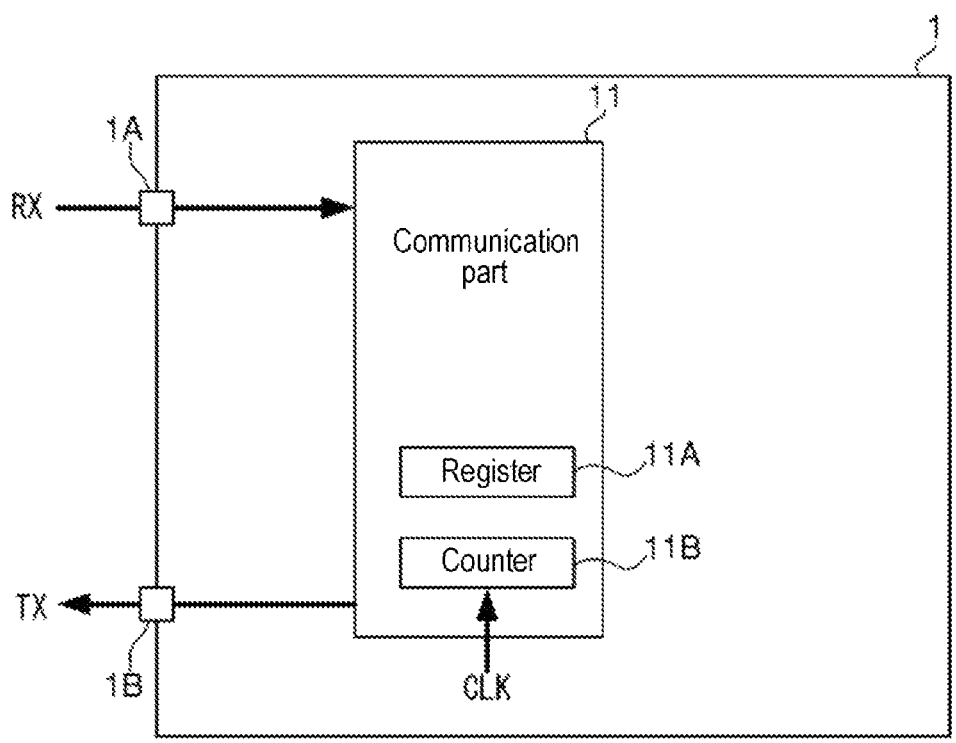
FIG. 4 is a diagram illustrating a block configuration of a part of a semiconductor device.

FIG. 4 is a diagram illustrating a block configuration of a part of the semiconductor device 1. The semiconductor device 1 includes a communication part 11 for performing UART communication. Further, the semiconductor device 1 may include other functional blocks not shown in FIG. 4. For example, if the semiconductor device 1 is an LED driver, it has block functions related to LED driving (a DC/DC converter function, a current driver, and the like).

The communication part 11 receives reception data RX via the RX terminal TA. The communication part 11 outputs transmission data TX via the TX terminal 1B. The communication part 11 includes a register 11A for storing data. Furthermore, the communication part 11 includes a counter 11B that counts a clock CLK for transition control of an internal state.
<3-2. Configuration of Reception Data>

Here, the data configuration of the reception data RX will be described by using the timing chart shown in FIG. 5. Details of FIG. 5 will be described later.

In the UART, communication is performed by data units called frames. A frame is composed of bit data from a start bit to a stop bit. The start bit is at a low level and the stop bit is at a high level. Bit data having a predetermined number of bits is arranged between the start bit and the stop bit. For example, if the predetermined number of bits is 8 bits, the frame is composed of bit data of 10 bits.

Figure 5:
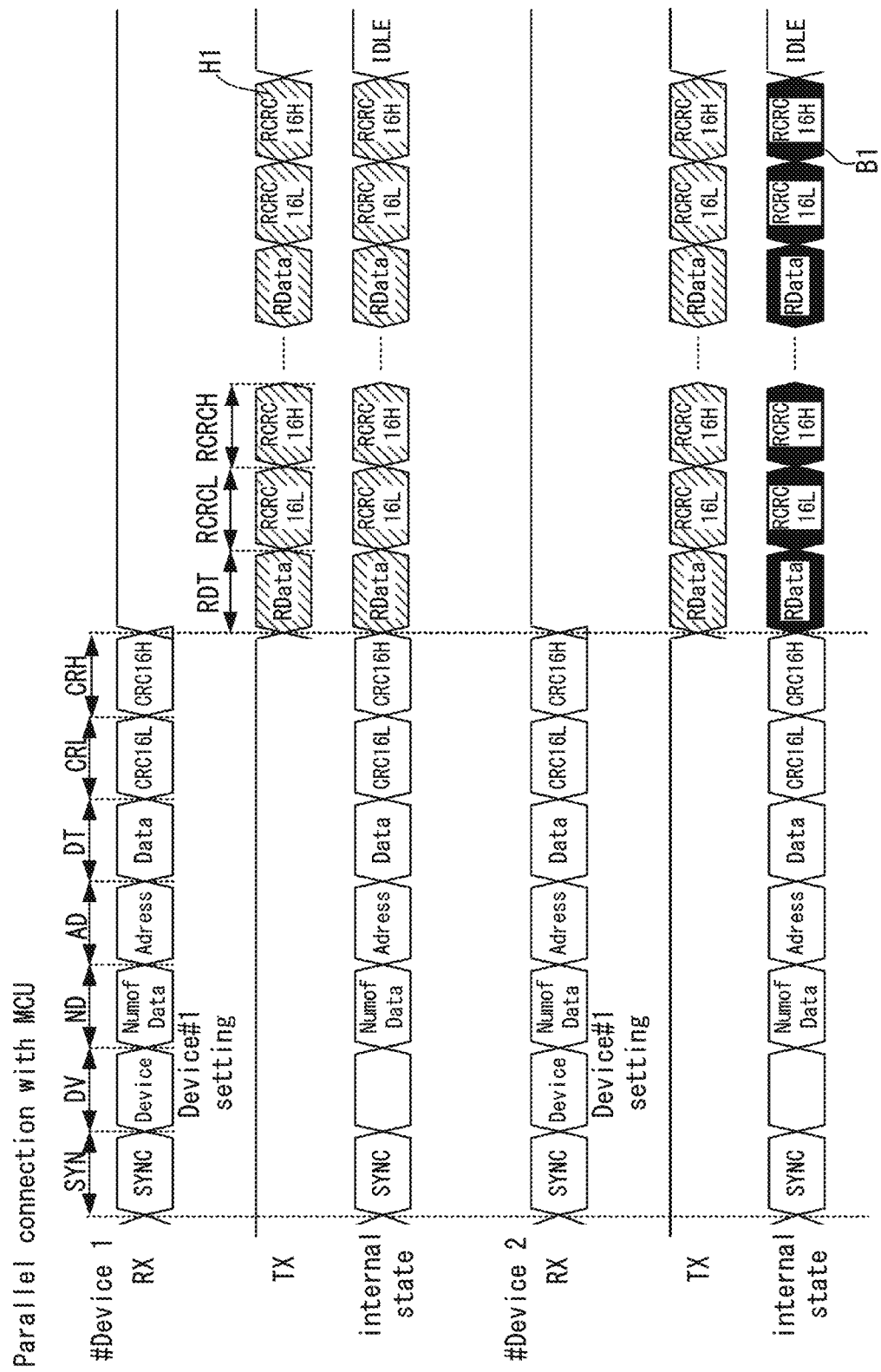
FIG. 5 is a timing chart showing a Read process when a semiconductor device according to a comparative example is used in the communication system shown in FIG. 2.

As shown in FIG. 5, the reception data RX includes a synchronization frame SYN, a device frame DV, a data number frame ND, a register address frame AD, a data frame DT, a CRC (Cyclic Redundancy Check) frame CRL, and a CRC frame CRH, which are arranged sequentially from the beginning.

The synchronization frame SYN is bit data for setting a baud rate in the semiconductor device 1. The baud rate is an index value indicating how many times digital data can be modulated in one second. For example, in serial communication in which one bit of digital data is transmitted by one modulation, the baud rate can be understood as an index value of communication speed (unit: bps [bit per second]).

The device frame DV includes a device address, a Read/Write bit, and the like. The device address is bit data indicating the address of a target device (semiconductor device 1). The Read/Write bit is bit data indicating Read or Write. Read indicates data reading from the semiconductor device 1 (Read process), and Write indicates data writing on the semiconductor device 1 (Write process).

The data number frame ND is bit data indicating the number of frames of the data frame DT. The register address frame AD is bit data indicating an address in the register 11A. The data frame DT is bit data indicating a data body transmitted by the reception data RX. The CRC frames CRL and CRH are bit data indicating an error detection code added to the data frame DT.

<3-3. When Not Connected to CAN Bus>

FIG. 5 is a timing chart showing a Read process when the semiconductor device 1 according to the comparative example is used in the communication system 102 shown in FIG. 2. In the following description, for the sake of convenience, it is assumed that n=2 for the n semiconductor devices 1.

In FIG. 5 and other figures to be described later, reception data RX, transmission data TX and an internal state in a communication part 11 for Device 1 (semiconductor device 1) are shown sequentially from above, and reception data RX, transmission data TX and an internal state in a communication part 11 for Device 2 (semiconductor device 1) are shown sequentially from above.

As shown in FIG. 5, as an example, it is assumed that the device address in the device frame DV of the reception data RX indicates Device 1 of the two semiconductor devices 1. That is, it is assumed that Device 1 is set as a target device. Further, Read is set in the Read/Write bit in the device frame DV of the reception data RX.

In this case, after receiving the reception data RX, the communication part 11 of Device 1 outputs the transmission data TX from the TX terminal 1B as Read back. The communication part 11 outputs the transmission data TX by using the data read from the register 11A as a read data frame RDT. When transmitting a plurality of read data frames RDT as shown in FIG. 5, the communication part 11 outputs a CRC frame RCRCL and a CRC frame RCRCH as transmission data TX after the last read data frame RDT.

At this time, the communication part 11 of Device 1 makes transition of the internal state in accordance with the transmission timing of the transmission data TX. Further, in FIG. 5 and other figures, hatching H1 indicates the data or the internal state depending on the transmission timing of Device 1.

On the other hand, in the communication part 11 of Device 2 other than the target device, after receiving the reception data RX, transition control of the internal state is performed based on the count of the clock CLK by the counter 11B. The transition control is performed based on the baud rate (bps) and a frequency of the clock CLK. The clock CLK of Device 2 is asynchronous with the clock CLK of Device 1, and transition control of the internal state is performed in Device 2 at its own timing. Further, in FIG. 5 and other figures, black portions B1 indicate the internal state of Device 2 depending on the timing.

<3-4. When Connected to CAN Bus>

Figure 6:
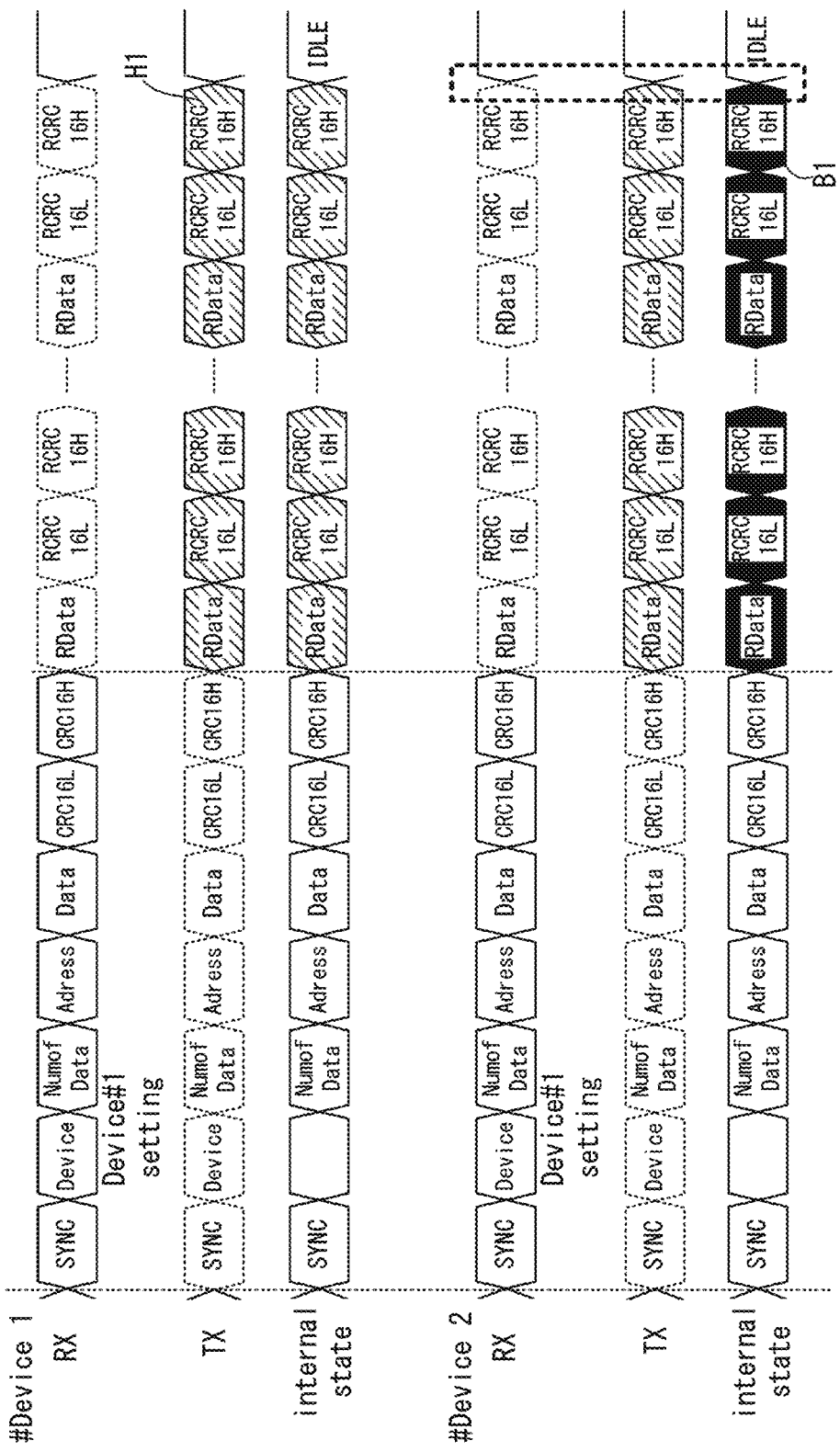
FIG. 6 is a timing chart showing a Read process when the semiconductor device according to the comparative example is used in the communication system shown in FIG. 1.

FIG. 6 is a timing chart showing the Read process when the semiconductor device 1 according to the comparative example is used in the communication system 101 shown in FIG. 1. That is, FIG. 6 is a timing chart when the semiconductor device 1 is connected to the CAN transceiver 5.

In FIG. 6, as a difference from FIG. 5, since the semiconductor device 1 is connected to the CAN transceiver 5, when Device 1 outputs the transmission data TX as Read back, data similar to the transmission data TX is generated as the reception data RX. This is because, due to the configuration of the CAN transceiver 5 described above (FIG. 3), when the transmission data TX inputted to the TXD terminal is outputted from the CANH terminal and the CANL terminal, the reception data RX is outputted from the RXD terminal through the receiver 93 and the output part 94.

In this case, the following problems arise. In FIG. 6, when Device 1 transmits transmission data TX, the communication part 11 of Device 2, which is not the target device, performs transition control of the internal state at the timing of Device 2, which is asynchronous with Device 1 as described above. When RCRC16H is completed after RData and RCRC16L, the internal state is transited to an idle state (IDLE) (see the dashed line frame in FIG. 6).

In the communication part 11 of Device 2, transition control of the internal state is performed based on the count of the clock CLK by the counter 11B but there is a possibility that a deviation in the timing of transition to the idle state may occur due to sampling errors. The larger the number of frames to be processed, the more sampling errors will accumulate and the timing deviation will become larger.

Figure 7A:
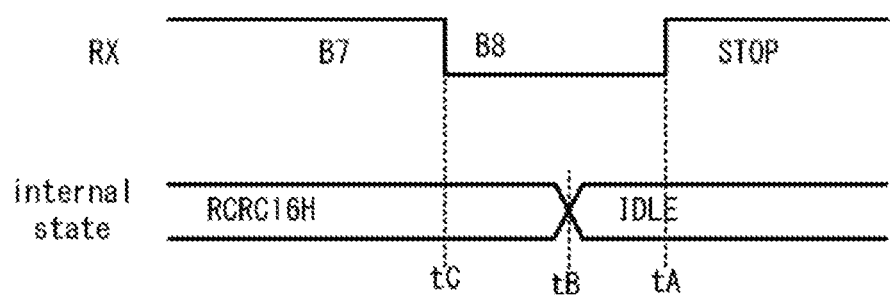
FIG. 7A is a timing chart showing an example of reception data RX and an internal state around a timing of transition to an idle state in Device 2.
Figure 7B:
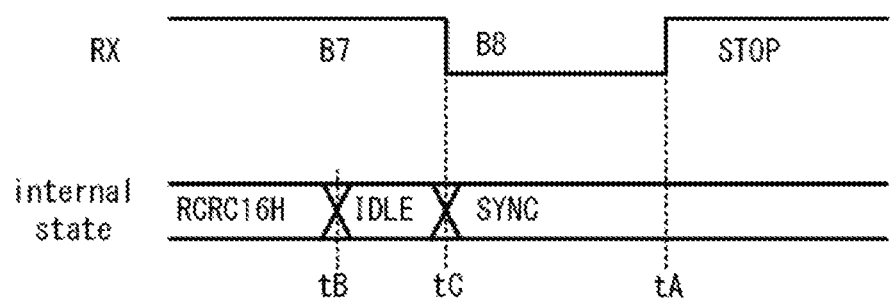
FIG. 7B is a timing chart showing another example of reception data RX and an internal state around a timing of transition to an idle state in Device 2.

FIGS. 7A and 7B are timing charts showing the reception data RX and the internal state around the timing of transition to the idle state in Device 2. That is, FIGS. 7A and 7B are enlarged views at the dashed line frame in FIG. 6.

FIGS. 7A and 7B show a case where the data frame includes data of 8 bits excluding a start bit and a stop bit, i.e., 10 bits in total. In FIGS. 7A and 7B, the seventh bit B7, the eighth bit B8 and the stop bit STOP of the last CRC frame RCRC16H in the reception data RX are illustrated. It is ideal that timing tB at which the internal state is transited from RCRC16H to the idle state coincides with timing tA at a boundary between the eighth bit B8 and the stop bit STOP.

FIG. 7A shows a case where a deviation of the timing tB from the ideal timing tA is small. In this case, the timing tB is after timing tC at the boundary between the seventh bit B7 and the eighth bit B8.

However, FIG. 7B shows a case where the deviation of the timing tB from the ideal timing tA is large. In FIG. 7B, the timing tB is before the timing tC at the boundary between the seventh bit B7 and the eighth bit B8. As a result, as shown in FIG. 7B, after the transition to the idle state, the switching from the high level to the low level of the reception data RX at the timing tC is erroneously detected as the start bit of the reception data RX, and the internal state is transited to SYNC. In the case of FIG. 7A, there is no problem because such a malfunction does not occur.

For example, in the case of a sampling error where there is a one clock deviation in 8 bits, the error will be 12.5 clocks in 10 frames (10 bits×10). If an upper limit of an allowable deviation is 32 clocks, then a malfunction may occur in 26 frames since 32 clocks×8 bits=256 bits.

4. First Embodiment

As described above, in order to solve the problem of malfunctions caused by Read back when the semiconductor device 1 is connected to the CAN transceiver 5, various embodiments described below are implemented.

Figure 8:
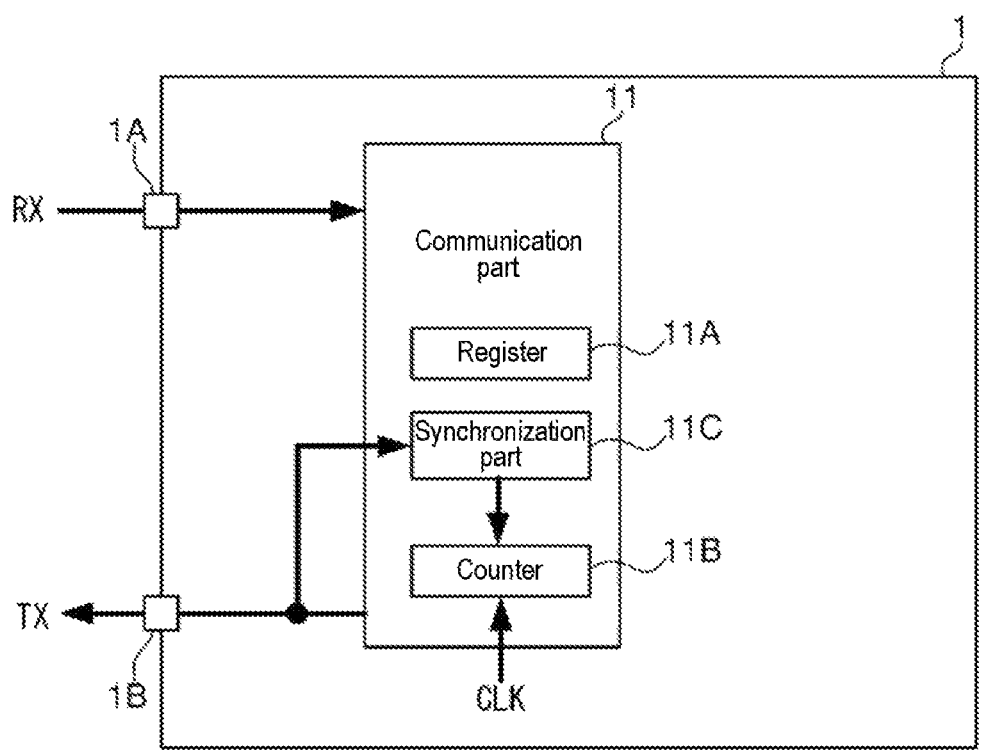
FIG. 8 is a diagram illustrating a configuration of a communication part in a semiconductor device according to a first embodiment of the present disclosure.

FIG. 8 is a diagram illustrating a configuration of a communication part 11 in a semiconductor device 1 according to a first embodiment of the present disclosure. The communication part 11 according to this embodiment includes a synchronization part 11C. The synchronization part 11C can monitor transmission data TX.

Figure 9:
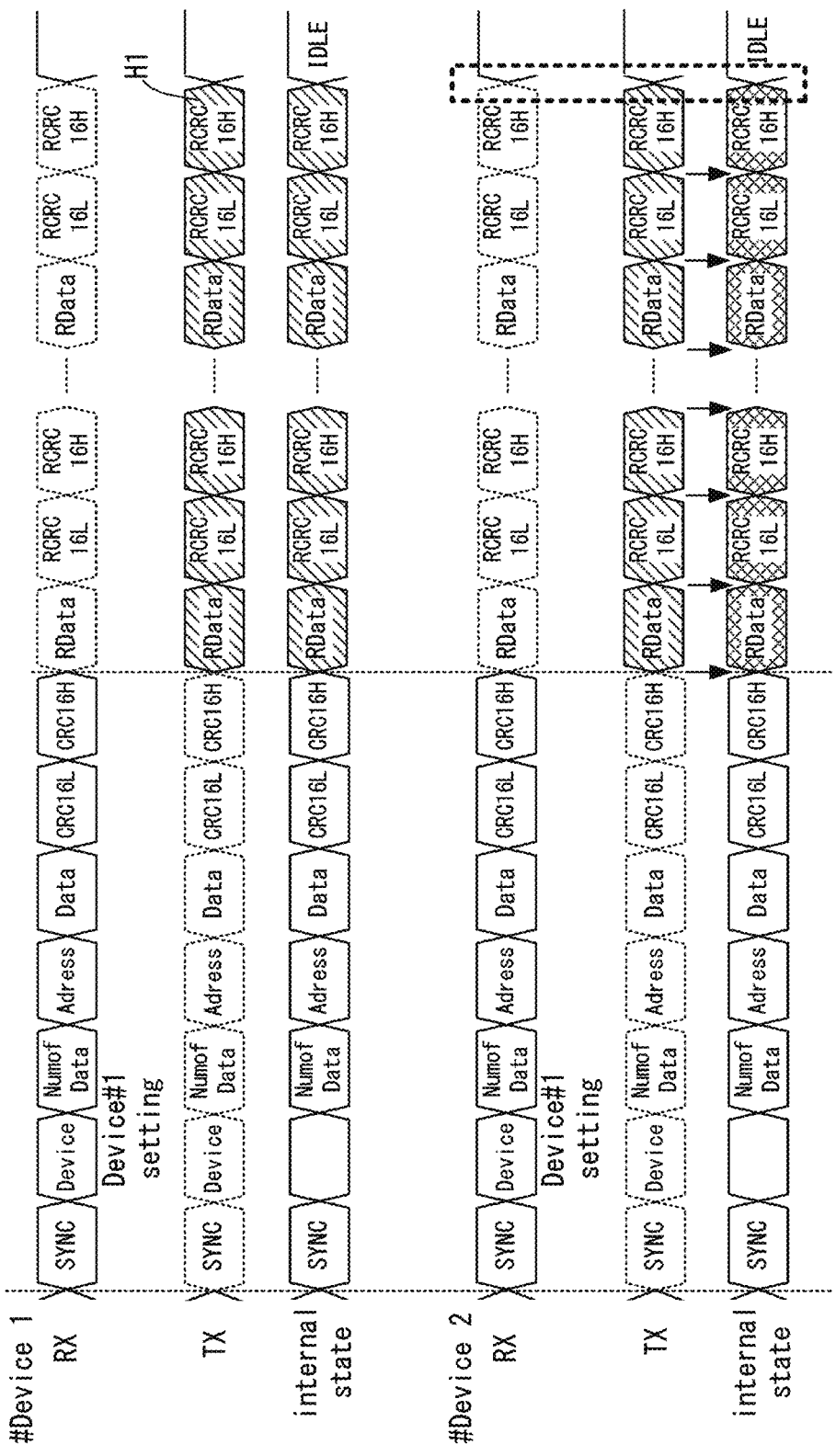
FIG. 9 is a timing chart showing a Read process when the semiconductor device according to the first embodiment is used in the communication system shown in FIG. 1.

FIG. 9 is a timing chart showing a Read process when the semiconductor device 1 according to the first embodiment is used in the communication system 101 shown in FIG. 1. That is, FIG. 9 is a timing chart when the semiconductor device 1 is connected to the CAN transceiver 5.

In this embodiment, when Device 1, which is the target device, outputs transmission data TX as Read back, the communication part 11 of Device 2, which is other than the target device, performs the following operation. In this case, the synchronization part 11C monitors the transmission data TX and upon detecting a stop bit and a start bit at the frame switching in the transmission data TX, the synchronization part 11C resets the count of the clock CLK by the counter 11B (see the arrows in FIG. 9). As a result, sampling errors are accumulated only within one frame so that it is possible to suppress a deviation in the timing of transition of the internal state to the idle state and to suppress malfunctions.

Further, even in the case of the communication system 102 (see FIG. 2) in which the CAN transceiver is not connected to the semiconductor device 1, according to this embodiment, at the time of Read back by Device 1, the communication part 11 of Device 2 other than the target device performs the same operation as described above by using the synchronization part IC that monitors the transmission data TX so that there is no need to switch control depending on the type of the communication system.

5. Second Embodiment

Figure 10:
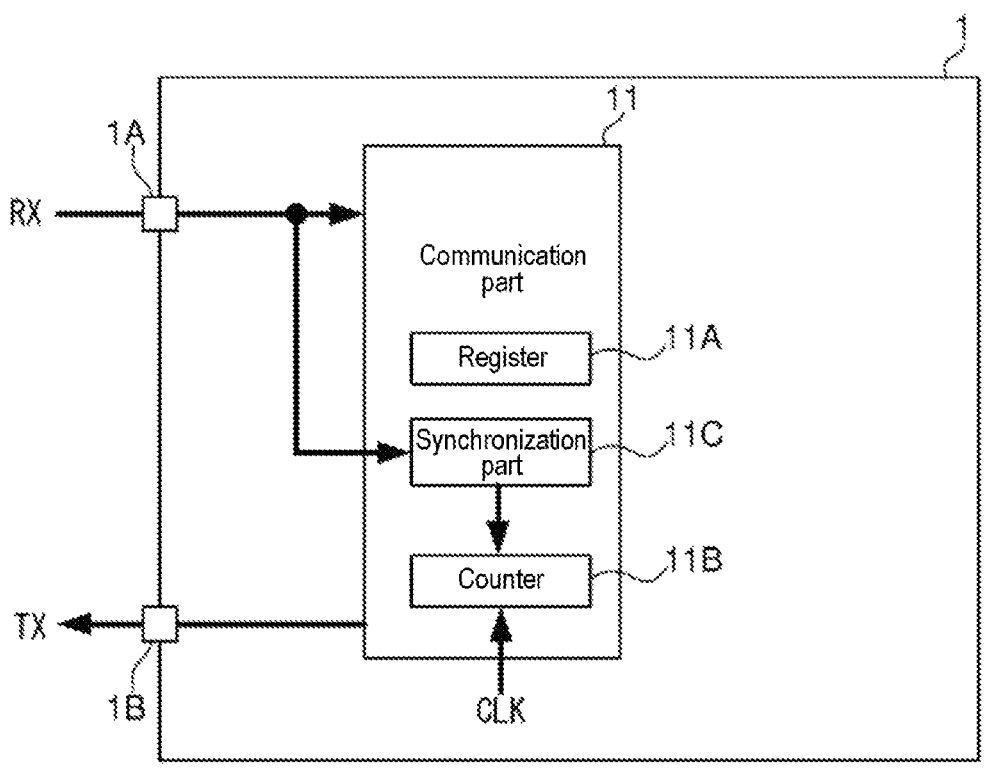
FIG. 10 is a diagram illustrating a configuration of a communication part in a semiconductor device according to a second embodiment of the present disclosure.

FIG. 10 is a diagram illustrating a configuration of a communication part 11 in a semiconductor device 1 according to a second embodiment of the present disclosure. The communication part 11 according to this embodiment includes a synchronization part 11C. The synchronization part IC can monitor reception data RX.

Figure 11:
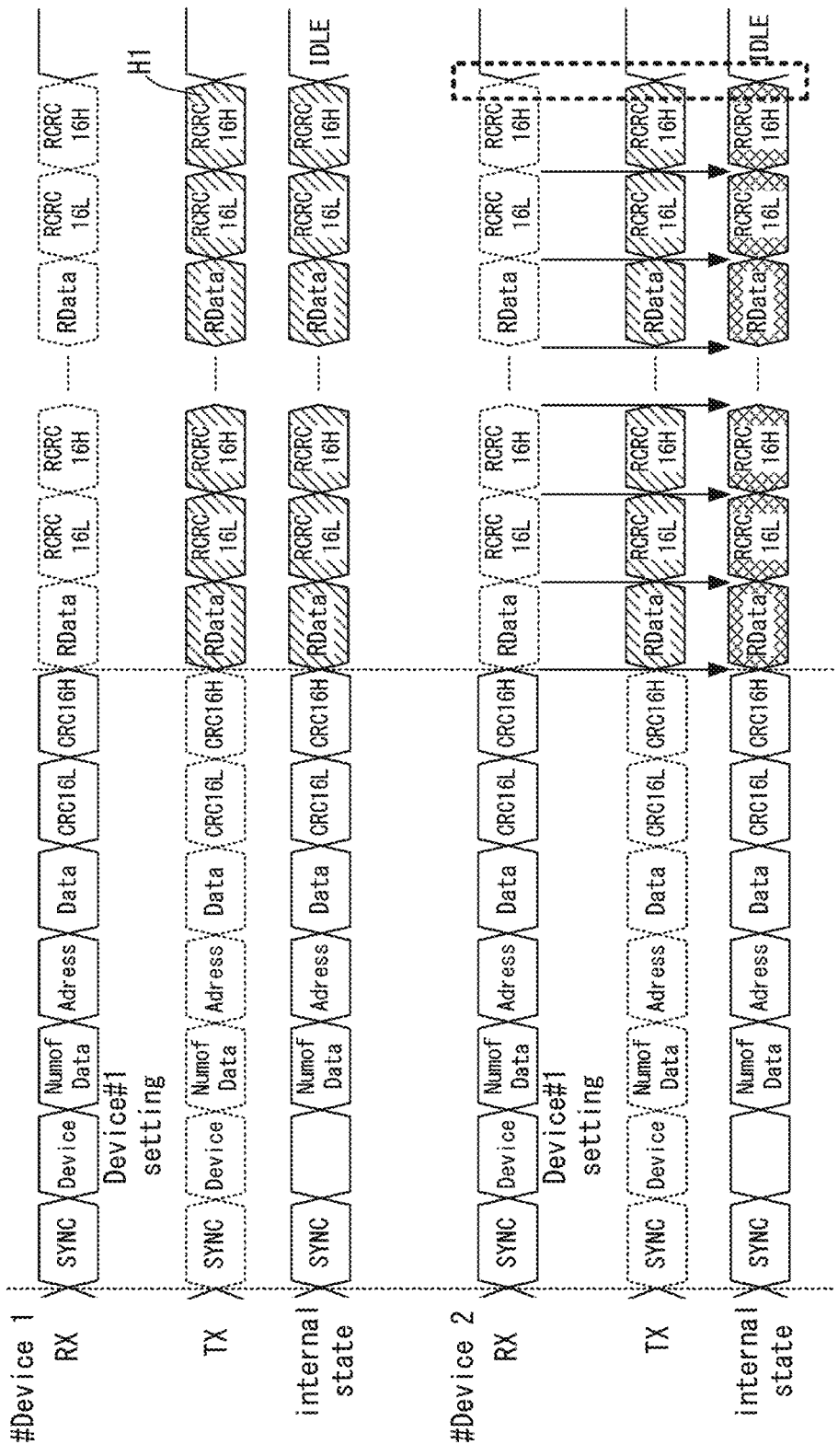
FIG. 11 is a timing chart showing a Read process when the semiconductor device according to the second embodiment is used in the communication system shown in FIG. 1.

FIG. 11 is a timing chart showing a Read process when the semiconductor device 1 according to the second embodiment is used in the communication system 101 shown in FIG. 1. That is, FIG. 11 is a timing chart when the semiconductor device 1 is connected to the CAN transceiver 5.

In this embodiment, when Device 1, which is the target device, outputs transmission data TX as Read back, the communication part 11 of Device 2, which is other than the target device, performs the following operation. In this case, the synchronization part 11C monitors the reception data RX and upon detecting a stop bit and a start bit at the frame switching in the reception data RX, the synchronization part 11C resets the count of the clock CLK by the counter 11B (see the arrows in FIG. 11). As a result, sampling errors are accumulated only within one frame so that it is possible to suppress a deviation in the timing of transition of the internal state to the idle state and to suppress malfunctions. Particularly, in this embodiment, since the count is synchronized with the reception data RX, the timing of transition to the idle state can be controlled with higher precision.

However, in the case of the communication system 102 (see FIG. 2) in which the CAN transceiver is not connected to the semiconductor device 1, since the reception data RX is not received at the time of Read back, the communication part 11 of Device 2 does not perform control by the synchronization part 11C (for example, count control according to the comparative example described above is performed).

6. Third Embodiment

Figure 12:
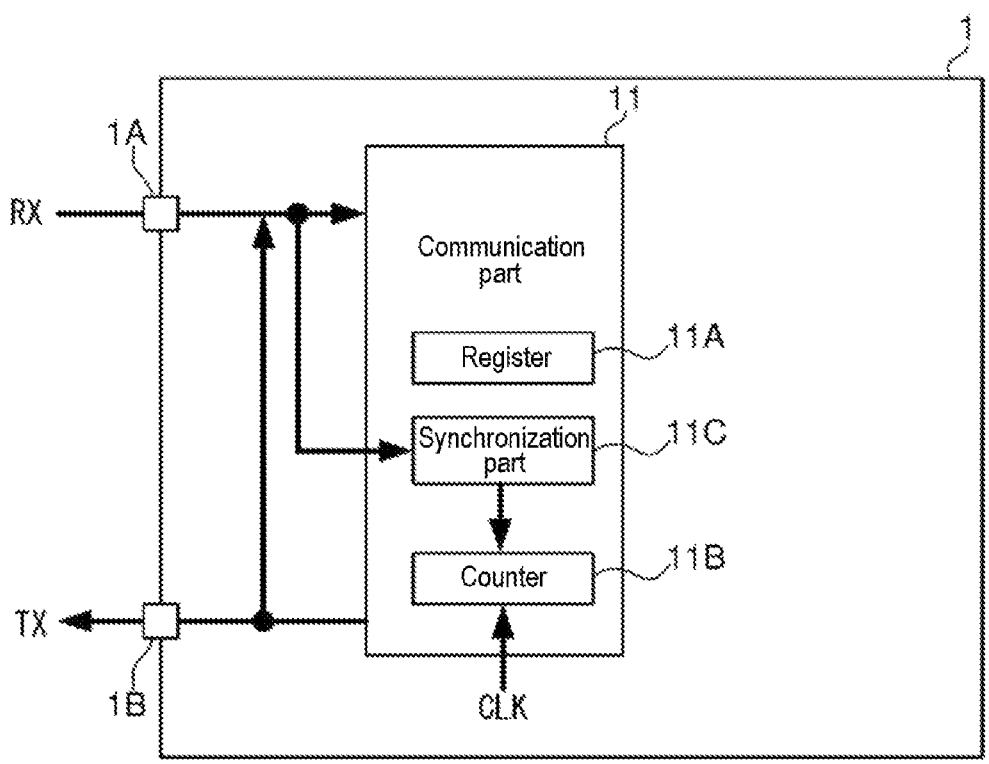
FIG. 12 is a diagram illustrating a configuration of a communication part in a semiconductor device according to a third embodiment of the present disclosure.

FIG. 12 is a diagram illustrating a configuration of a communication part 11 in a semiconductor device 1 according to a third embodiment of the present disclosure. The communication part 11 according to this embodiment includes a synchronization part 11C. The synchronization part 11C can monitor transmission data RX. Further, in this embodiment, transmission data TX is inputted to the reception data RX.

Figure 13:
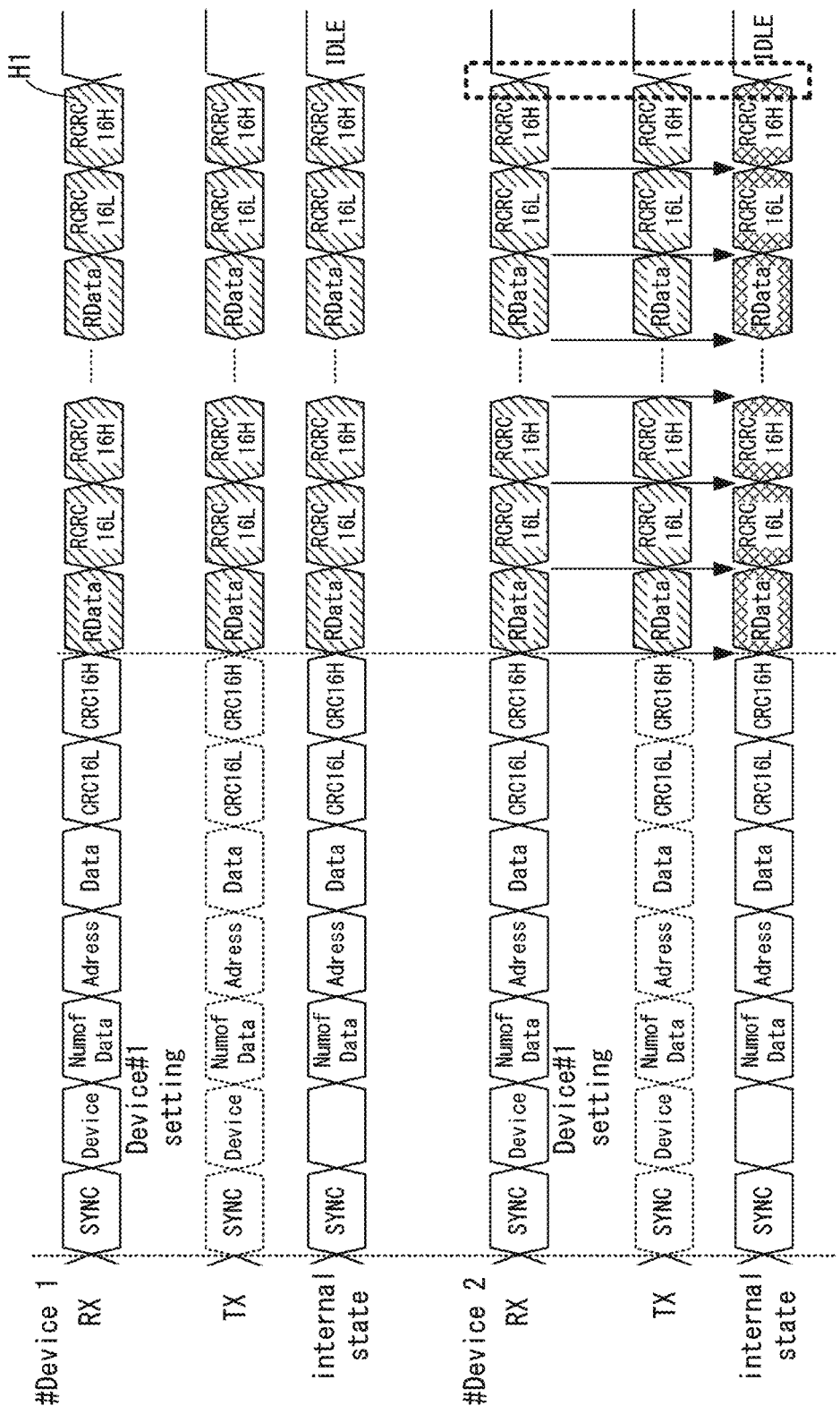
FIG. 13 is a timing chart showing a Read process when the semiconductor device according to the third embodiment is used in the communication system shown in FIG. 1.

FIG. 13 is a timing chart showing a Read process when the semiconductor device 1 according to the third embodiment is used in the communication system 101 shown in FIG. 1. That is, FIG. 13 is a timing chart when the semiconductor device 1 is connected to the CAN transceiver 5.

In this embodiment, when Device 1, which is a target device, outputs transmission data TX as Read back, the transmission data TX is inputted to the reception data RX. At this time, the communication part 11 of Device 2, which is not the target device, performs the following operation. In this case, the synchronization part 11C monitors the reception data RX and upon detecting a stop bit and a start bit at the frame switching in the reception data RX, the synchronization part 11C resets the count of the clock CLK by the counter 11B (see the arrows in FIG. 13). As a result, since sampling errors are accumulated only within one frame, it is possible to suppress a deviation in the timing of transition of the internal state to the idle state and to suppress malfunctions. Particularly, in this embodiment, since the count is synchronized with the reception data RX, the timing of transition to the idle state can be controlled with higher precision.

Further, in this embodiment, even in the case of the communication system 102 (see FIG. 2) in which the CAN transceiver is not connected to the semiconductor device 1, when Device 1 outputs the transmission data TX as Read back, the transmission data TX is inputted to the reception data RX. Therefore, the communication part 11 of Device 2 performs control using the synchronization part 11C. That is, in this embodiment, there is no need to switch control depending on the type of the communication system.

Further, in this embodiment, when receiving the reception data RX (from SYNC to CRC16H), since the communication part 11 performs control using the synchronization part IC that monitors the reception data RX, except when outputting the transmission data TX, transition control of the internal state may be performed based on the reception data RX.

7. Others

Various technical features disclosed in this specification are not limited to the above-described embodiments but may be modified in various forms without departing from the spirit of the technical creation. That is, the above-described embodiments should be considered to be exemplary in all respects and not limitative. It should be understood that the technical scope of the present disclosure is not limited to the above-described embodiments, and encompasses all changes that fall within the meaning and range equivalent to the claims.

8. Supplementary Notes

As described above, the semiconductor device (1) according to one aspect of the present disclosure comprises:
  a reception data input terminal (1A) configured such that reception data (RX), which is serial data, is input;
  a transmission data output terminal (1B) configured such that transmission data (TX), which is serial data, is output; and
  a communication part (11) configured to receive the reception data and transmit the transmission data,
  wherein the communication part includes:
    a counter (11B); and
    a synchronization part (11C) configured to monitor the transmission data if the semiconductor device is other than a target device set in the reception data, and reset a count by the counter upon detecting a stop bit and a start bit at frame switching in the transmission data (first configuration, FIG. 8).

Further, the semiconductor device (1) according to one aspect of the present disclosure comprises:
  a reception data input terminal (1A) configured such that reception data (RX), which is serial data, is input;
  a transmission data output terminal (1B) configured such that transmission data (TX), which is serial data, is output; and
  a communication part (11) configured to receive the reception data and transmit the transmission data,
  wherein the communication part includes:
    a counter (11B); and
    a synchronization part (1C) configured to monitor the reception data if the semiconductor device is other than a target device set in the reception data, and reset a count by the counter upon detecting a stop bit and a start bit at frame switching in the transmission data (second configuration).

Further, in the second configuration, the synchronization part (11C) may be configured to switch whether or not to perform synchronization control depending on whether or not the semiconductor device (1) is connected to a transmitting/receiving device (5) capable of communicating by a differential voltage method (third configuration, FIG. 10).

Further, in the third configuration, the transmitting/receiving device may be a CAN transceiver (5) (fourth configuration).

Further, in the second configuration, the synchronization part (IC) may be configured to monitor the reception data as a result that the transmission data (TX) is input to the reception data (RX) (fifth configuration, FIG. 12).

Further, the communication system (101) according to one aspect of the present disclosure comprises:
  a plural number of the semiconductor device (1) having any one of the first to fifth configurations; and
  a transmitting/receiving device (5) including a reception data output terminal (5A) to which a plural number of the reception data input terminal (TA) of the plural number of the semiconductor device are commonly connected and a transmission data input terminal (5B) to which a plural number of the transmission data output terminal (1B) of the plural number of the semiconductor device are commonly connected, the transmitting/receiving device (5) capable of communicating by a differential voltage method (sixth configuration, FIG. 1).

Further, in the sixth configuration, the transmitting/receiving device may be a CAN transceiver (5) (seventh configuration).

Further, the communication system (101) according to one aspect of the present disclosure comprises:
  a plural number of the semiconductor device (1) having any one of the first to fifth configurations; and
  an MCU (2) including a reception data output terminal (2A) to which a plural number of the reception data input terminal (1A) of the plural number of the semiconductor device are commonly connected and a transmission data input terminal (5B) to which a plural number of the transmission data output terminal (1B) of the plural number of the semiconductor device are commonly connected (eighth configuration, FIG. 2).

The present disclosure can be used, for example, in an in-vehicle communication system.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A semiconductor device, comprising:
  a reception data input terminal configured such that reception data, which is serial data, is input;
  a transmission data output terminal configured such that transmission data, which is serial data, is output; and
  a communication part configured to receive the reception data and transmit the transmission data,
  wherein the communication part includes:
    a counter; and
    a synchronization part configured to monitor the transmission data if the semiconductor device is other than a target device set in the reception data, and reset a count by the counter upon detecting a stop bit and a start bit at frame switching in the transmission data.

2. A communication system, comprising:
  a plural number of semiconductor devices including the semiconductor device of claim 1; and
  a transmitting/receiving device including a reception data output terminal to which a plural number of reception data input terminals of the plural number of semiconductor devices are commonly connected and a transmission data input terminal to which a plural number of transmission data output terminals of the plural number of semiconductor devices are commonly connected, the transmitting/receiving device capable of communicating by a differential voltage method.

3. The communication system of claim 2, wherein the transmitting/receiving device is a CAN transceiver.

4. A communication system, comprising:
  a plural number of semiconductor devices including the semiconductor device of claim 1; and an MCU including a reception data output terminal to which a plural number of reception data input terminals of the plural number of semiconductor devices are commonly connected and a transmission data input terminal to which a plural number of transmission data output terminals of the plural number of semiconductor device are commonly connected.

5. A semiconductor device, comprising:
a reception data input terminal configured such that reception data, which is serial data, is input;
a transmission data output terminal configured such that transmission data, which is serial data, is output; and
a communication part configured to receive the reception data and transmit the transmission data,
wherein the communication part includes:
  a counter; and
  a synchronization part configured to monitor the reception data if the semiconductor device is other than a target device set in the reception data, and reset a count by the counter upon detecting a stop bit and a start bit at frame switching in the transmission data.

6. The semiconductor device of claim 5, wherein the synchronization part is configured to switch whether or not to perform synchronization control depending on whether or not the semiconductor device is connected to a transmitting/receiving device capable of communicating by a differential voltage method.

7. The semiconductor device of claim 6, wherein the transmitting/receiving device is a CAN transceiver.

8. The semiconductor device of claim 5, wherein the synchronization part is configured to monitor the reception data as a result that the transmission data is input to the reception data.

9. A communication system, comprising:
a plural number of semiconductor devices including the semiconductor device of claim 5; and
a transmitting/receiving device including a reception data output terminal to which a plural number of reception data input terminals of the plural number of semiconductor devices are commonly connected and a transmission data input terminal to which a plural number of transmission data output terminals of the plural number of semiconductor devices are commonly connected, the transmitting/receiving device capable of communicating by a differential voltage method.

10. A communication system, comprising:
a plural number of semiconductor devices including the semiconductor device of claim 5; and
an MCU including a reception data output terminal to which a plural number of reception data input terminals of the plural number of semiconductor devices are commonly connected and a transmission data input terminal to which a plural number of transmission data output terminals of the plural number of semiconductor device are commonly connected.

* * * * *